(No Model.)
J. T. SCARBROUGH.
COMBINED SEED PLANTER AND FERTILIZER DISTRIBUTER.
No. 422,452. Patented Mar. 4, 1890.
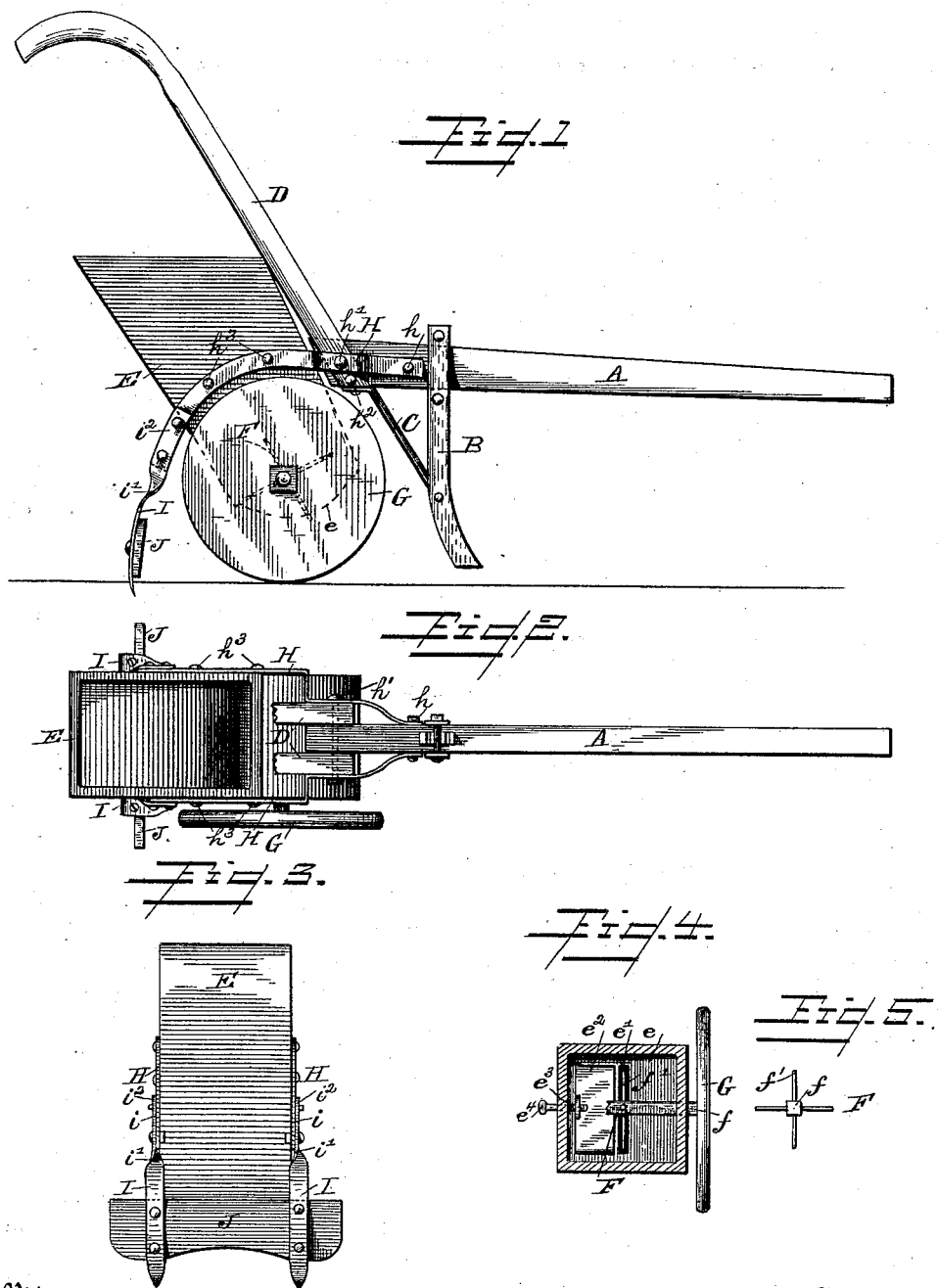

UNITED STATES PATENT OFFICE.

JOE T. SCARBROUGH, OF LAFAYETTE, ALABAMA.

COMBINED SEED-PLANTER AND FERTILIZER-DISTRIBUTER.

SPECIFICATION forming part of Letters Patent No. 422,452, dated March 4, 1890.

Application filed October 11, 1889. Serial No. 326,715. (No model.)

*To all whom it may concern:*

Be it known that I, JOE T. SCARBROUGH, a citizen of the United States, residing at Lafayette, county of Chambers, and State of Alabama, have invented certain new and useful Improvements in a Combined Seeder and Fertilizer-Distributer, of which the following is a specification.

The object of my invention is to provide apparatus for planting seed, particularly cotton-seed, and for distributing fertilizers.

My invention consists in the improved apparatus hereinafter described, whereby devices for planting seed-cotton, distributing fertilizing material, and cultivating the ground are combined in one machine and may readily be attached to an ordinary plow or cultivator.

The subject-matter is hereinafter designated.

In the accompanying drawings, Figure 1 is a side elevation of my improvements applied to an ordinary plow. Fig. 2 is a plan view. Fig. 3 is a rear elevation. Fig. 4 is a detail view showing the interior arrangement of the seed-hopper and the devices for adjusting the feed-opening in the hopper. Fig. 5 is a detail of the feeder.

My improvements are shown as applied to an ordinary plow, in which A indicates the plow-beam; B, the plow-standard secured thereto, and C the rearwardly-extending brace of the plow-standard. The handles D are secured to the rear ends of the plow-beam and extend rearwardly therefrom. The seed hopper or box E is made, preferably, rectangular in shape, open at the top, and having a curved bottom $e$, which is provided with a slot $e'$. In the bottom of the hopper is a slide $e^2$, which is secured to a screw-threaded stem $e^3$, extending through the side of the hopper and provided on the outside with a thumb-piece or handle $e^4$. By adjusting the thumb-piece the slide may be moved to vary the opening in the bottom of the hopper. By this means the opening is adjusted so that either seed or fertilizing material may be fed through the hopper. The rotary feed-wheel F is shown as consisting of a shaft $f$, to which are secured radially-projecting arms $f'$. The shaft $f$ extends through the sides of the hopper near its lower end, so that the arms $f'$ extend into the slot in the bottom of the hopper and feed the seed or fertilizing material through it. At one end of the shaft $f'$ is secured the driving-wheel G.

As shown in the drawings, the hopper E is inclined rearwardly from its lower end, the upper end rests against the handles D, and the body of the hopper is secured to the rear end of the plow-beam by straps H. These straps are preferably bars of iron bent to the desired shape. The front ends of the straps are secured to the plow-beam by the bolt $h$, extending through the beam close to the plow-standard B and in rear thereof. From the front ends the straps extend rearwardly and outwardly, embracing the lower ends of the handles D. The same bolt $h'$ which secures the handles to the plow-beam secures the straps to the handles. A bolt $h^2$ is also employed to secure the handles to the plow-beam. From the bolt $h'$ the straps extend rearwardly a short distance and are then bent laterally at right angles and extend in front of the hopper-box to the edge thereof, and are then bent at right angles rearwardly and curved downwardly to extend beyond the rear ends of the hopper. Bolts $h^3$ secure the straps to the sides of the hopper, as shown. The cultivating and covering teeth I are arranged in rear of the hopper, on each side thereof. The teeth are connected by a cross-plate J, which is arranged a short distance above the points or cutting ends of the teeth, and is preferably curved on its lower edge between the teeth to facilitate in spreading the earth. The teeth are secured to the rearwardly and downwardly projecting ends of the straps by their shanks $i$, which are preferably formed integrally with the teeth, being twisted at $i'$, so as to present flat upper ends $i^2$, which are secured to the ends of the straps. The teeth may be readily removed and replaced, if desired.

The hopper and all the connected parts may be removed from the plow-beam by simply removing the bolts $h$ and $h'$, and the plow may be used with the proper plow-shovel or cultivators in the usual way.

I claim as of my own invention—

1. The combination, substantially as hereinbefore set forth, of the plow-beam, the hopper arranged in rear of the plow-beam, the straps secured to each side of the plow-beam at their front ends and to the handles by the same bolt that secures them to the plow-beam, said straps being bent laterally from the handles to the sides of the hopper, and then bent rearwardly and downwardly and secured to the hopper, and the teeth in rear of the hopper, secured to the rearwardly-projecting ends of the straps.

2. The combination, substantially as hereinbefore set forth, of the plow-beam, the hopper, the straps secured to the plow-beam and to the hopper, the teeth in rear of the hopper, connected by a cross-plate having a curved lower edge between the teeth, said teeth having their shanks twisted, as described, and secured to the rearwardly-projecting ends of the straps.

3. The combination, substantially as hereinbefore set forth, of the plow-beam, the hopper arranged in rear of the plow-beam and inclined from its lower end outwardly and resting at its upper end against the handles of the plow, the straps secured to the plow-beam and to the hopper, the teeth in rear of the hopper, secured to the rearwardly-projecting straps, the driving-wheel, its shaft, the radially-projecting arms on the shaft, extending into a slot or opening in the bottom of the hopper, and the adjusting-slide for varying the opening.

In testimony whereof I have hereunto subscribed my name.

JOE T. SCARBROUGH.

Witnesses:
F. P. NICHOLS,
S. P. WARD.